United States Patent
Dalton

(10) Patent No.: US 7,929,866 B2
(45) Date of Patent: Apr. 19, 2011

(54) PASSIVE OPTICAL NETWORK MEDIA ACCESS CONTROLLER ASSISTED CLOCK RECOVERY

(75) Inventor: Rodger Dalton, Wake Forest, NC (US)

(73) Assignee: Alcatel Lucent, Paris (FR)

( * ) Notice: Subject to any disclaimer, the term of this patent is extended or adjusted under 35 U.S.C. 154(b) by 708 days.

(21) Appl. No.: 11/380,589

(22) Filed: Apr. 27, 2006

(65) Prior Publication Data

US 2007/0122159 A1 May 31, 2007

Related U.S. Application Data

(60) Provisional application No. 60/740,099, filed on Nov. 28, 2005.

(51) Int. Cl.
*H04B 10/00* (2006.01)

(52) U.S. Cl. .......... 398/155; 398/167; 398/168

(58) Field of Classification Search .......... 398/155, 398/167, 168
See application file for complete search history.

(56) References Cited

U.S. PATENT DOCUMENTS

| 3,641,274 | A | 2/1972 | Sasaki et al. | |
| --- | --- | --- | --- | --- |
| 4,731,880 | A | 3/1988 | Ault et al. | |
| 5,208,693 | A | 5/1993 | Arstein et al. | |
| 6,362,911 | B1 | 3/2002 | Lee et al. | |
| 2005/0135523 | A1* | 6/2005 | Carballo | 375/354 |
| 2005/0281355 | A1* | 12/2005 | Cranford et al. | 375/316 |
| 2006/0083343 | A1* | 4/2006 | Roederer et al. | 375/375 |
| 2006/0098768 | A1* | 5/2006 | Romero et al. | 375/346 |
| 2008/0209494 | A1* | 8/2008 | Dravida et al. | 725/129 |

FOREIGN PATENT DOCUMENTS

| EP | 0317159 A2 * | 5/1989 |
| --- | --- | --- |
| EP | 0451289 A1 | 10/1991 |
| EP | 0720319 A2 | 7/1996 |
| EP | 1172955 A2 | 1/2002 |
| GB | 2171577 A | 8/1986 |

OTHER PUBLICATIONS

Uhlhorn, R. W.; Proceedings of the IEEE National Aerospace and Electronics Conference 1998 (NAECON 1998); Jul. 13-17, 1998; pp. 160-167.

* cited by examiner

*Primary Examiner* — Dzung D Tran
(74) *Attorney, Agent, or Firm* — RG & Associates

(57) ABSTRACT

A system, method, and computer readable medium for passive optical network media access controller assisted clock recovery which enables an optical receiver to recover a clock phase of an incoming data stream from an optical network unit comprises collecting phase data from a previous data stream clock recovery for an optical network unit, and providing the collected phase data as a starting value phase clock for subsequent incoming data streams for the optical network unit.

19 Claims, 3 Drawing Sheets

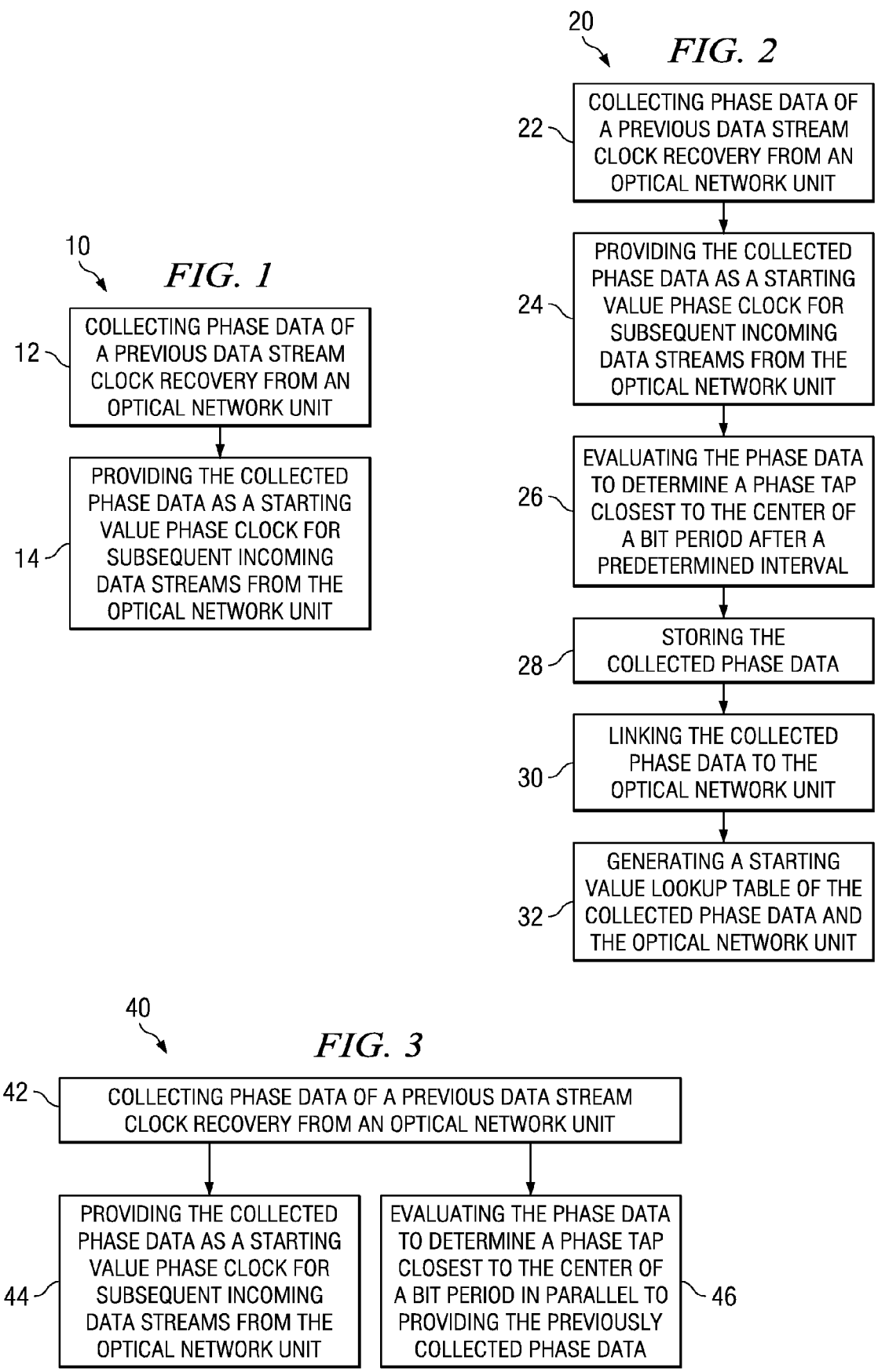

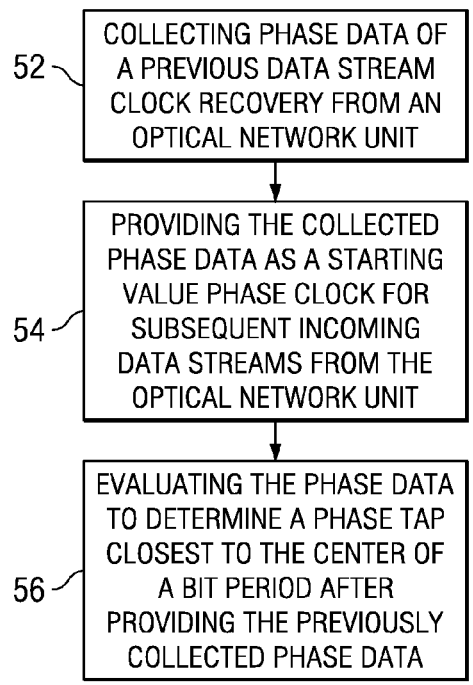
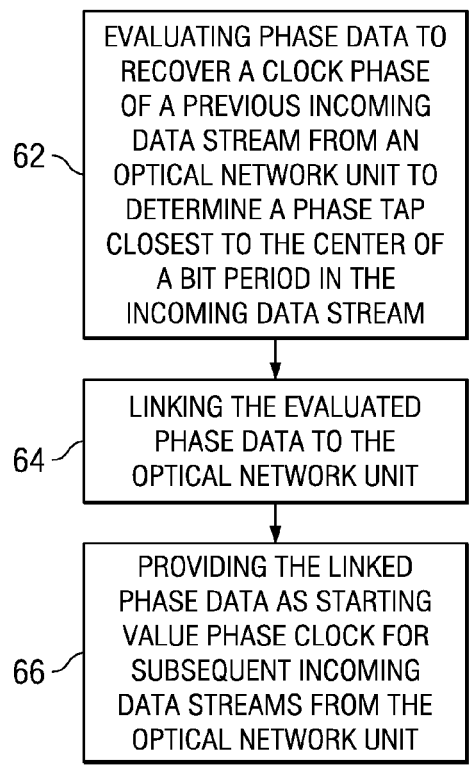
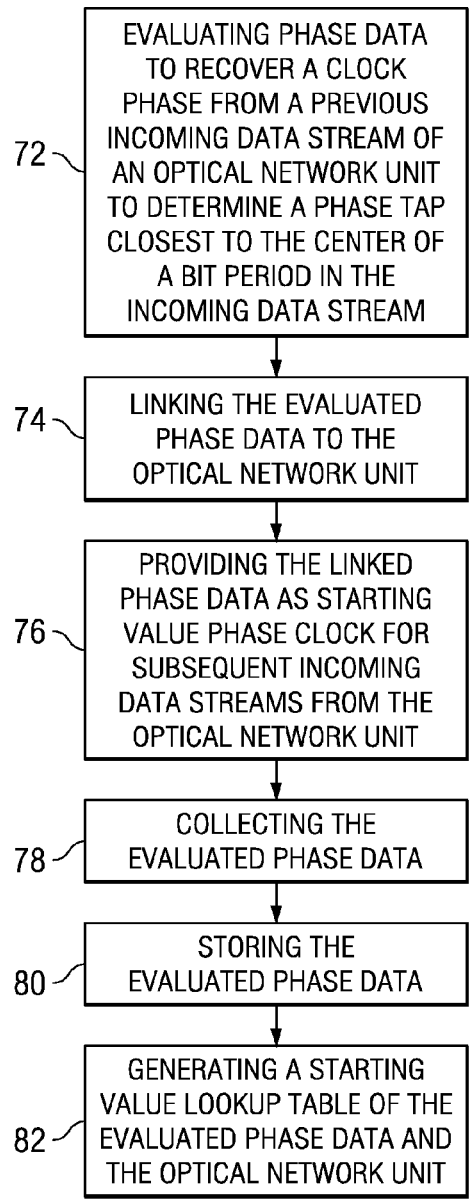

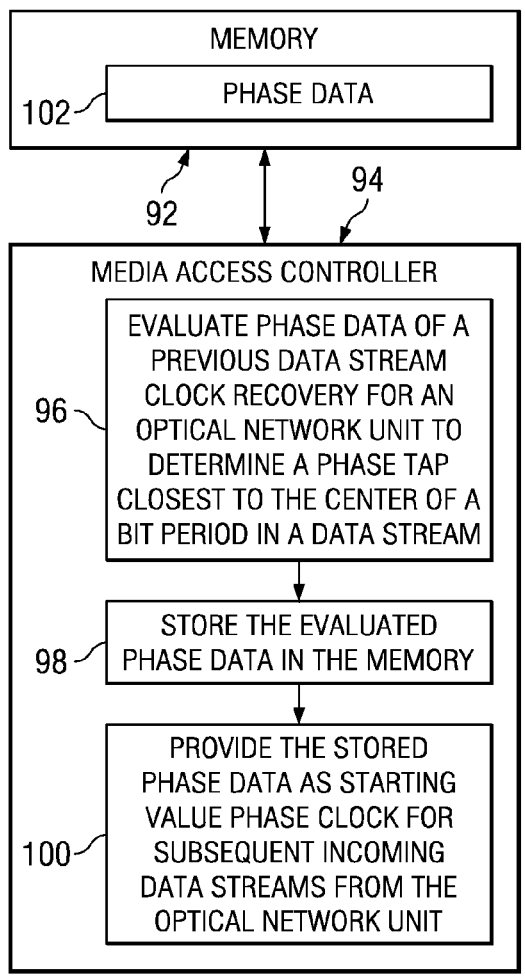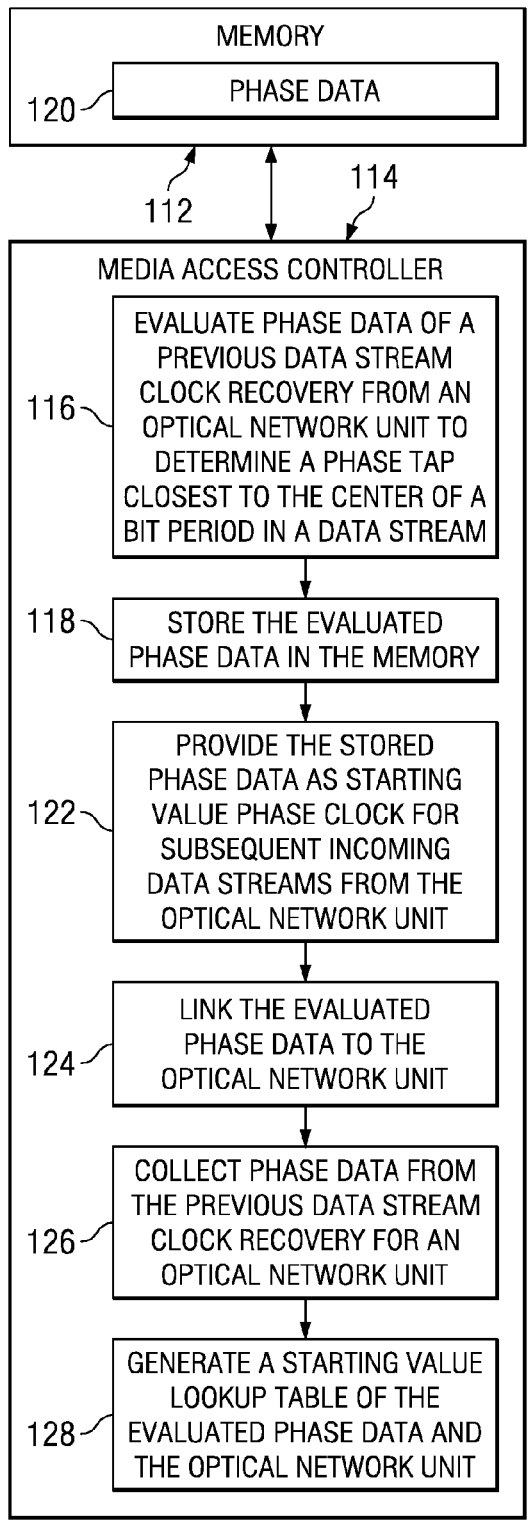

PASSIVE OPTICAL NETWORK MEDIA ACCESS CONTROLLER ASSISTED CLOCK RECOVERY

CROSS REFERENCE TO RELATED APPLICATIONS

The present patent application is related to and claims the benefit of provisional patent application Ser. No. 60/740,099, filed on Nov. 28, 2005, entitled "Burst Mode Optical Receiver", the entire contents of which are incorporated by reference herein.

BACKGROUND OF THE INVENTION

A Passive Optical Network (PON) based access systems such as those specified in the International Telecommunications Union (ITU) Gigabit Passive Optical Network (GPON) standard (G.984) and ITU Broadband Passive Optical Network (BPON) standard (G.983) requires a preamble to allow clock recovery on an upstream signal.

Currently, there exists a tradeoff between how quickly a Clock Phase Aligner (CPA) or Clock Data Recovery (CDR) device can recover the correct clock phase from the incoming data stream and the amount of power consumed by the device. To reduce power consumption, longer preambles are employed. The primary advantage of MAC assisted clock recovery is a reduction in preamble which decreases overhead and therefore increases the percentage of the upstream bandwidth that is available to carry traffic.

Each Optical Network Unit (ONU) on the PON has a nearly constant phase relationship between its data stream and the local reference clock on the Optical Line Termination (OLT) that remains essentially constant over short to medium periods of time. The phase relationship changes as the fiber buried in the ground changes temperature. Since the ground temperature is fairly constant, and changes very slowly when it does change, the phase relationship between the ONU and LT remains constant for all practical purposes for periods of hours at a time. Therefore what is needed is a passive optical network media access controller assisted clock recovery that can take advantage of this constant phase relationship. More specifically, the present invention allows the PON Media Access Controller (MAC) to retain this constant phase relationship information any time a cell is received upstream, such as during ranging of a previous cell from a specific ONU which will be utilized to seed the CPA/CDR with a starting phase relationship value that will be extremely close to the optimized phase value thereby reducing the amount of time required for the CPA/CDR to acquire lock.

SUMMARY OF THE INVENTION

Currently, various CPA and CDR architectures developed specifically for PON applications allow rapid phase acquisition, at the cost of high power dissipation and loss of Duty Cycle Distortion (DCD) tolerance. This loss of DCD tolerance further increases the required preamble as additional time is required for the data stream from the optics to stabilize.

The PON is loop timed therefore the upstream data is frequency matched to the local reference clock of the OLT. This allows the use of a CPA instead of a CDR. CPAs in general are faster as they do not employ an analog Phase Locked Loop (PLL). CPAs recover clock from data by utilizing a clock that is an integer multiple of the data clock rate. Different edges of the higher rate clock are then divided back down to the data clock rate to provide a number of clocks, each at the data rate, but at different phases relative to each other. The task then is to choose which of these clocks or phase taps is closest to the center of a bit period to allow for reliable recovery of the data by the PON MAC.

Currently, the CPA must determine which phase tap is correct, and so a sequence of logic evaluates each tap against the data to determine which phase is the closest to the center of a bit period. The variation in phase between the various ONUs and the OLT is driven by the physical distance between the ONU and the OLT and the temperature of the optical fiber. In the present invention, the PON MAC recalls the selected phase tap from a prior transmission from the given ONU and provides it to the CPA. The CPA uses the previous tap as its starting point for determining the new phase tap. Since the phase changes very slowly over time, the previous tap is most likely the correct choice and if not, the correct tap will be only one increment away. Therefore the CPA will not need to traverse the logic tree more than two levels to determine the correct tap, which will substantially reduce the amount of time required for the CPA to acquire phase lock.

Variation in data phase for an ONU occurs very slowly, and is caused predominantly by changes in fiber temperature. Additionally, over sampling granularity can be quite high such that several tap values near the center of a bit period will provide error free reception. These two observations lead to the conclusion that the information provided by the MAC is much better than an initial approximation. In fact, the phase provided by the MAC can be used with no preamble for clock recovery, and the CPA can analyze the phase during data reception to see if a slight change in tap selection is warranted. Therefore, the present invention can potentially reduce the preamble for clock recovery to zero which represents a significant increase in system performance. It should also be noted that even with standard optics, the proactive CPA will provide better DCD tolerance and less preamble would be required to allow the optics to settle. An additional feature of the present invention provides for phase information to be collected during ranging.

In one embodiment of the present invention, a method for passive optical network media access controller assisted clock recovery which enables an optical receiver to recover a clock phase of an incoming data stream from an optical network unit comprises collecting phase data from a previous data stream clock recovery for an optical network unit, and providing the collected phase data as a starting value phase clock for subsequent incoming data streams from the optical network unit. The method may also comprise evaluating the phase data to determine a phase tap closest to the center of a bit period after a predetermined interval, evaluating the phase data to determine a phase tap closest to the center of a bit period in parallel to providing the previously collected phase data or evaluating the phase data to determine a phase tap closest to the center of a bit period after providing the previously collected phase data. Additionally, the method may comprise storing the collected phase data, linking the collected phase data to the optical network unit, generating a starting value lookup table of the collected phase data and the optical network unit wherein the collecting and providing occur at the media access controller. Additionally, the phase data may be collected during ranging.

In a further embodiment of the present invention, a computer readable medium comprises instructions for evaluating phase data to recover a clock phase of a previous incoming data stream from an optical network unit to determine a phase tap closest to the center of a bit period in the incoming data stream, linking the evaluated phase data to the optical network unit, and providing the linked phase data as starting value phase clock for subsequent incoming data streams for the optical network unit. The computer readable medium may also comprise instructions for collecting the evaluated phase data, for storing the evaluated phase data and for generating a starting value lookup table of the evaluated phase data and the optical network unit, wherein the evaluation occurs after a predetermined interval, in parallel to providing the previously collected phase data or after providing the previously collected phase data.

In yet a further embodiment, a system for passive optical network media access controller assisted clock recovery comprises a memory, and a media access controller communicably coupled to the memory, the media access controller adapted to, evaluate phase data of a previous data stream clock recovery from an optical network unit to determine a phase tap closest to the center of a bit period in a data stream, store the evaluated phase data in the memory, and provide the stored phase data as starting value phase clock for subsequent incoming data streams from the optical network unit. Wherein the media access controller is adapted to link the evaluated phase data to the optical network unit, to collect phase data from the previous data stream clock recovery for an optical network unit and to generate a starting value lookup table of the evaluated phase data and the optical network unit.

BRIEF DESCRIPTION OF THE DRAWINGS

FIG. 1 depicts a first method flow diagram of passive optical network media access controller assisted clock recovery in accordance with a preferred embodiment of the present invention;

FIG. 2 depicts a second method flow diagram of passive optical network media access controller assisted clock recovery in accordance with a preferred embodiment of the present invention;

FIG. 3 depicts a third method flow diagram of passive optical network media access controller assisted clock recovery in accordance with a preferred embodiment of the present invention;

FIG. 4 depicts a fourth method flow diagram of passive optical network media access controller assisted clock recovery in accordance with a preferred embodiment of the present invention;

FIG. 5 depicts a first software flow diagram of passive optical network media access controller assisted clock recovery in accordance with a preferred embodiment of the present invention;

FIG. 6 depicts a second software flow diagram of passive optical network media access controller assisted clock recovery in accordance with a preferred embodiment of the present invention;

FIG. 7 depicts a first system of passive optical network media access controller assisted clock recovery in accordance with a preferred embodiment of the present invention; and FIG. 8 depicts a second system of passive optical network media access controller assisted clock recovery in accordance with a preferred embodiment of the present invention.

DETAILED DESCRIPTION OF THE INVENTION

Referring now to FIG. 1, a first flow diagram of the method 10 of passive optical network media access controller assisted clock recovery is depicted. The method enables an optical receiver to recover a clock phase for an incoming data stream from an optical network unit by collecting 12 phase data from a previous data stream clock recovery for an optical network unit, and providing 14 the collected phase data as a starting value phase clock for subsequent incoming data streams for the optical network unit. The method is performed by software, hardware, firmware, and/or the combination of software, hardware, and/or firmware.

Referring now to FIG. 2, a flow diagram of the method 20 of passive optical network media access controller assisted clock recovery is depicted. The method enables an optical receiver to recover a clock phase for an incoming data stream from an optical network unit the method comprises collecting 22 phase data from a previous data stream clock recovery for an optical network unit, and providing 24 the collected phase data as a starting value phase clock for subsequent incoming data streams for the optical network unit. The method may also comprise 26 evaluating the phase data to determine a phase tap closest to the center of a bit period after a predetermined interval, storing 28 the collected phase data, linking 30 the collected phase data to the optical network unit and generating 32 a starting value lookup table of the collected phase data and the optical network unit wherein the collecting and providing occur at the media access controller. The method is performed by software, hardware, firmware, and/or the combination of software, hardware, and/or firmware.

Referring now to FIG. 3, a third flow diagram of the method 40 of passive optical network media access controller assisted clock recovery is depicted. The method enables an optical receiver to recover a clock phase for an incoming data stream from an optical network unit the method comprises collecting 42 phase data from a previous data stream clock recovery for an optical network unit, providing 44 the collected phase data as a starting value phase clock for subsequent incoming data streams for the optical network unit and evaluating 46 the phase data to determine a phase tap closest to the center of a bit period in parallel to providing the previously collected phase data. The method is performed by software, hardware, firmware, and/or the combination of software, hardware, and/or firmware.

Referring now to FIG. 4, a fourth flow diagram of the method 50 of passive optical network media access controller assisted clock recovery is depicted. The method enables an optical receiver to recover a clock phase for an incoming data stream from an optical network unit the method comprises collecting 52 phase data from a previous data stream clock recovery for an optical network unit, providing 54 the collected phase data as a starting value phase clock for subsequent incoming data streams for the optical network unit and evaluating 56 the phase data to determine a phase tap closest to the center of a bit period after providing the previously collected phase data. The method is performed by software, hardware, firmware, and/or the combination of software, hardware, and/or firmware.

Referring now to FIG. 5, a first software flow diagram 60 of passive optical network media access controller assisted clock recovery is depicted. The computer readable medium comprises instructions for evaluating 62 phase data to recover a clock phase from a previous incoming data stream from an optical network unit to determine a phase tap closest to the center of a bit period in the incoming data stream, linking 64 the evaluated phase data to the optical network unit, and providing 66 the linked phase data as starting value phase clock for subsequent incoming data streams for the optical network unit. The transfer of information between the MAC and the memory occurs via at least one of a wireless protocol, a wired protocol and the combination of a wireless protocol and a wired protocol. These steps are performed by software but in other embodiments, may be performed by hardware, firmware, and/or the combination of software, hardware, and/or firmware without departing from the scope of the present invention.

Referring now to FIG. 6, a second software flow diagram 70 of passive optical network media access controller assisted clock recovery is depicted. The computer readable medium comprises instructions for evaluating 72 phase data to recover a clock phase from a previous incoming data stream from an optical network unit to determine a phase tap closest to the center of a bit period in the incoming data stream, linking 74 the evaluated phase data to the optical network unit, providing 76 the linked phase data as starting value phase clock for subsequent incoming data streams for the optical network unit, collecting 78 the evaluated phase data, storing 80 the evaluated phase data and generating 82 a starting value lookup table of the evaluated phase data and the optical network unit. The transfer of information between the MAC and the memory occurs via at least one of a wireless protocol, a wired protocol and a combination of a wireless protocol and a wired protocol. These steps are performed by software but in other embodiments, may be performed by hardware, firmware, and/or the combination of software, hardware, and/or firmware without departing from the scope of the present invention.

Referring now to FIG. 7, a first system 90 of passive optical network media access controller assisted clock recovery is depicted. The system comprises a memory 92, and a media access controller 94 communicably coupled to the memory. The media access controller is adapted to evaluate 96 phase data from a previous data stream clock recovery for an optical network unit to determine a phase tap closest to the center of a bit period in a data stream, store 98 the evaluated phase data in the memory, and provide 100 the stored phase data 102 as starting value phase clock for subsequent incoming data streams for the optical network unit. The transfer of information between the MAC and the memory occurs via at least one of a wireless protocol, a wired protocol and a combination of a wireless protocol and a wired protocol. The steps performed in this figure are performed by software, hardware, firmware, and/or the combination of software, hardware, and/or firmware. The system 90 can be used to perform he functionality described in FIGS. 1-6.

Referring now to FIG. 8, a second system 110 of passive optical network media access controller assisted clock recovery is depicted. The system comprises a memory 112, and a media access controller 114 communicably coupled to the memory. The media access controller is adapted to evaluate 116 phase data from a previous data stream clock recovery for an optical network unit to determine a phase tap closest to the center of a bit period in a data stream, store 118 the evaluated phase data 120 in the memory, provide 122 the stored phase data as starting value phase clock for subsequent incoming data streams for the optical network unit, link 124 the evaluated phase data to the optical network unit, collect 126 phase data from the previous data stream clock recovery for an optical network unit and generate 128 a starting value lookup table of the evaluated phase data and the optical network unit. The transfer of information between the MAC and the memory occurs via at least one of a wireless protocol, a wired protocol and a combination of a wireless protocol and a wired protocol. The steps performed in this figure are performed by software, hardware, firmware, and/or the combination of software, hardware, and/or firmware.

Although an exemplary embodiment of the system of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the media access controllers, optical network units or optical line terminations. Also, these capabilities may be performed in the current manner or in a distributed manner and on, or via, any device able to provide, send and/or receive clock signals and/or phase data. Further, although depicted in a particular manner, various modules or blocks may be repositioned without departing from the scope of the current invention. For example, the functionality performed by the media access controller and memory can be self-contained. Still further, although depicted and/or described in a particular manner, a greater or lesser number media access controllers, optical network units, optical line terminations and memories can be utilized with the present invention in order to accomplish the present invention, to provide additional known features to the present invention, and/or to make the present invention more efficient. Also, communication between such modules or blocks can occur via a cellular phone, a computer with external wireless capability (such as a wireless card) or internal wireless capability (such as 802.11 or any of the other 802 variants), an Internet Protocol enabled phone, and/or any device that is able to send and receive information.

What is claimed is:

1. A method of enabling an optical receiver to recover a clock phase of an incoming data stream from an optical network unit, comprising:
    collecting phase data including a phase tap selected during a previous data stream clock recovery from an optical network unit;
    evaluating the phase data of the previous data stream clock recovery from the optical network unit to determine a phase tap closest to a middle of a data bit in a data stream; and
    providing the collected phase data including the phase tap of the previous data stream clock recovery as a starting value of a phase clock for subsequent incoming data streams from the optical network unit.

2. The method of claim 1 comprising evaluating the phase data to determine a phase tap closest to the middle of a data bit after a predetermined interval.

3. The method of claim 1 comprising evaluating the phase data to determine a phase tap closest to the middle of a data bit in parallel to providing the previously collected phase data.

4. The method of claim 1 comprising evaluating the phase data to determine a phase tap closest to the middle of a data bit after providing the previously collected phase data.

5. The method of claim 1 comprising storing the collected phase data.

6. The method of claim 1 comprising linking the collected phase data to the optical network unit.

7. The method of claim 1 comprising generating a lookup table of the collected phase data and the optical network unit.

8. The method of claim 1 wherein the collecting occurs at the media access controller.

9. The method of claim 1 wherein the providing occurs at the media access controller.

10. A computer readable medium configured for use on a media access controller communicably coupled to a memory, the computer readable medium comprising instructions for:
    collecting phase data including a phase tap selected during a previous data stream clock recovery from an optical network unit;

evaluating the phase data to recover a clock phase of a previous incoming data stream from an optical network unit to determine a phase tap closest to a middle of a data bit in the incoming data stream;

linking the evaluated phase data and the collected phase data to the optical network unit; and providing the linked phase data including the phase tap as a starting value of a phase clock for subsequent incoming data streams from the optical network unit.

11. The computer readable medium of claim 10 comprising instructions for collecting the evaluated phase data.

12. The computer readable medium of claim 10 comprising instructions for storing the evaluated phase data.

13. The computer readable medium of claim 10 comprising instructions for generating a lookup table of the evaluated phase data and the optical network unit.

14. The computer readable medium of claim 10 wherein the evaluation occurs after a predetermined interval.

15. The computer readable medium of claim 10 wherein the evaluation occurs after providing the previously collected phase data.

16. The system of claim 15 wherein the media access controller is adapted to link the evaluated phase data to the optical network unit.

17. The system of claim 15 wherein the media access controller is adapted to collect phase data from the previous data stream clock recovery of an optical network unit.

18. The system of claim 15 wherein the media access controller is adapted to generate a lookup table of the evaluated phase data and the optical network unit.

19. A system for passive optical network media access controller assisted clock recovery, comprising:

a memory; and a media access controller communicably coupled to the memory, the media access controller configured to:

provide phase data including a phase tap selected during a previous data stream clock recovery from an optical network unit and evaluate phase data of the previous data stream clock recovery from the optical network unit to determine a phase tap closest to a middle of a data bit in a data stream;

store the evaluated phase data and the previously collected phase data in the memory; and provide the stored phase data including the phase tap as a starting value of a phase clock for subsequent incoming data streams from the optical network unit.

\* \* \* \* \*